R. BEACHMAN.
CAST IRON EXTERIOR COFFINS OR VAULTS.
No. 189,596. Patented April 17, 1877.
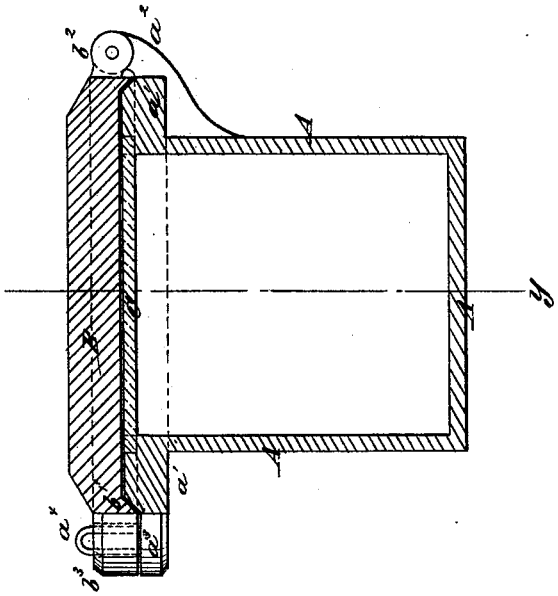
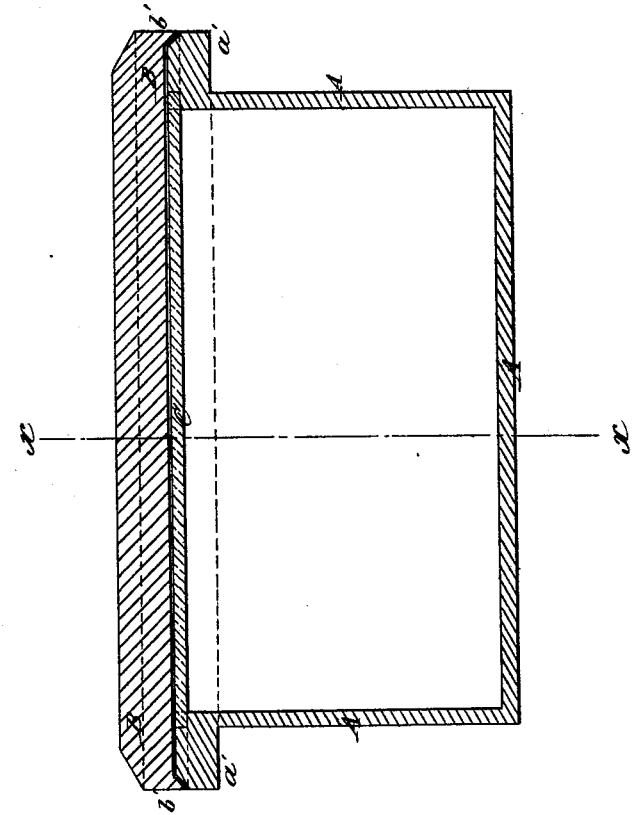
WITNESSES:
INVENTOR:
R. Beachman.
BY
ATTORNEYS.

UNITED STATES PATENT OFFICE.

ROBERT BEACHMAN, OF LYONS, NEW YORK.

IMPROVEMENT IN CAST-IRON EXTERIOR COFFINS OR VAULTS.

Specification forming part of Letters Patent No. 189,596, dated April 17, 1877; application filed March 19, 1877.

*To all whom it may concern:*

Be it known that I, ROBERT BEACHMAN, of Lyons, in the county of Wayne and State of New York, have invented a new and Improved Cast-Iron Individual Vault or Grave, of which the following is a specification:

Figure 1 is a vertical longitudinal section of my improved individual vault, taken through the line $y\ y$, Fig. 2. Fig. 2 is a vertical cross-section of the same, taken through the line $x\ x$, Fig. 1.

The object of this invention is to furnish an improved individual vault or grave which shall be air-tight, so as to keep the coffin and body from the air, and thus preserve them, which will protect the body from worms, will enable the vault and body to be removed, and which will be cheaper, and at the same time better than a stone or brick grave.

The invention will first be described in connection with the drawing, and then pointed out in the claim.

A is the body of the vault, which is made of cast-iron, and of suitable length, breadth, and depth to receive the coffin. Around the mouth of the body or box $a$ is formed a rabbet to receive the edges of the glass plate C, which is designed to be cemented into said rabbet. The glass-plate C enables the body or coffin to be inspected whenever desired. The plate C may also be made of cast-iron, if desired. Around the mouth of the box $a$ is formed a flange, $a^1$, the outer edge of which is beveled off to receive the beveled lip $b^1$, formed around the edge of the cast-iron cover B, which fits snugly upon the flange of the box $a$, and has lugs $b^2$ formed upon its rear edge, by which it is hinged to lugs $a^2$ formed upon the upper part of the rear side of the said box $a$. Upon the upper part of the forward side of the box $a$ is formed a lug, $a^3$, provided with a staple, $a^4$, to project through a hole in a lug, $b^3$, formed upon the forward edge of the cover B to receive a padlock.

Having thus described my invention, what I claim as new, and desire to secure by Letters Patent, is—

The body A, having rabbeted edge flanged at $a^1$, and having lugs $a^2\ a^3$, the latter of which is provided with a staple, in combination with plate C and cover B, the latter having lip $b^1$ and lugs $b^2\ b^3$, as and for the purpose specified.

ROBERT BEACHMAN.

Witnesses:
   H. RADDER,
   GEORGE D. SCHUZLER.